(12) United States Patent
Risse

(10) Patent No.: US 7,730,254 B2
(45) Date of Patent: Jun. 1, 2010

(54) MEMORY BUFFER FOR AN FB-DIMM

(75) Inventor: Gerhard Risse, Munich (DE)

(73) Assignee: Qimonda AG, Munich (DE)

( * ) Notice: Subject to any disclaimer, the term of this patent is extended or adjusted under 35 U.S.C. 154(b) by 370 days.

(21) Appl. No.: 11/831,557

(22) Filed: Jul. 31, 2007

(65) Prior Publication Data

US 2008/0177940 A1    Jul. 24, 2008

(30) Foreign Application Priority Data

Jul. 31, 2006    (DE) .................... 10 2006 035 612

(51) Int. Cl.
*G06F 12/00* (2006.01)

(52) U.S. Cl. .................... 711/105; 711/5; 711/151; 711/167; 710/36

(58) Field of Classification Search ............... 711/105, 711/5, 151, 167; 710/36
See application file for complete search history.

(56) References Cited

U.S. PATENT DOCUMENTS 7,200,710 B2 *  4/2007  Perego et al. ............... 711/105
7,206,896 B2 *  4/2007  Perego et al. ............... 711/105
7,206,897 B2 *  4/2007  Perego et al. ............... 711/105
7,266,634 B2 *  9/2007  Ware et al. .................. 711/105
7,320,047 B2 *  1/2008  Perego et al. ................... 711/5
7,356,639 B2 *  4/2008  Perego et al. ............... 711/105
7,363,422 B2 *  4/2008  Perego et al. ............... 711/105
7,404,032 B2 *  7/2008  Ware et al. .................. 711/105
2005/0278495 A1   12/2005  Lee
2006/0047899 A1    3/2006  Ilda et al.

OTHER PUBLICATIONS

Haas, J., et al., "Fully -Buffered DIMM Technology Moves Enterprise Platforms to the Next Level," Mar. 2005, pp. 1-7, Technology@Intel Magazine.

* cited by examiner

*Primary Examiner*—Stephen C Elmore
(74) *Attorney, Agent, or Firm*—Slater & Matsil, L.L.P.

(57) ABSTRACT

A memory buffer for an FB-DIMM having a first input/output interface for communicating with a memory controller at a first payload data rate and a second input/output interface for communicating with memory packages at a second payload data rate, wherein a relation of the first payload data rate to the second payload data is greater than 10.

20 Claims, 7 Drawing Sheets

FIG 3
(PRIOR ART)

| TRANSFER | bit 9 | 8 | 7 | 6 | 5 | 4 | 3 | 2 | 1 | 0 | | |
|---|---|---|---|---|---|---|---|---|---|---|---|---|
| 0 | aE0 | aE7 | aE8 | WSn | aC20 | aC16 | aC12 | aC8 | aC4 | aC0 | } | A |
| 1 | aE1 | aE6 | aE9 | 0 | aC21 | aC17 | aC13 | aC9 | aC5 | aC1 | | |
| 2 | aE2 | aE5 | aE10 | aE13 | aC22 | aC18 | aC14 | aC10 | aC6 | aC2 | | |
| 3 | aE3 | aE4 | aE11 | aE12 | aC23 | aC19 | aC15 | aC11 | aC7 | aC3 | | |
| 4 | FE21 | DM0 | C8.D0 | C7.D0 | C6.D0 | C5.D0 | C4.D0 | C3.D0 | C2.D0 | C1.D0 | } | B |
| 5 | FE20 | DM1 | C8.D1 | C7.D1 | C6.D1 | C5.D1 | C4.D1 | C3.D1 | C2.D1 | C1.D1 | | |
| 6 | FE19 | DM2 | C8.D2 | C7.D2 | C6.D2 | C5.D2 | C4.D2 | C3.D2 | C2.D2 | C1.D2 | | |
| 7 | FE18 | DM3 | C8.D3 | C7.D3 | C6.D3 | C5.D3 | C4.D3 | C3.D3 | C2.D3 | C1.D3 | | |
| 8 | FE17 | DM4 | C8.D4 | C7.D4 | C6.D4 | C5.D4 | C4.D4 | C3.D4 | C2.D4 | C1.D4 | | |
| 9 | FE16 | DM5 | C8.D5 | C7.D5 | C6.D5 | C5.D5 | C4.D5 | C3.D5 | C2.D5 | C1.D5 | | |
| 10 | FE15 | DM6 | C8.D6 | C7.D6 | C6.D6 | C5.D6 | C4.D6 | C3.D6 | C2.D6 | C1.D6 | | |
| 11 | FE14 | DM7 | C8.D7 | C7.D7 | C6.D7 | C5.D7 | C4.D7 | C3.D7 | C2.D7 | C1.D7 | | |

MEMORY BUFFER FOR AN FB-DIMM

This application claims priority from German Patent Application No. 10 2006 035 612.8, which was filed on Jul. 31, 2006, and is incorporated herein by reference in its entirety.

TECHNICAL FIELD

An embodiment of the present invention relates to a memory buffer for an FB-DIMM (FB-DIMM=Fully Buffered Dual Inline Memory Module) such as an FB-DIMM having DDR2-SDRAM memory packages (DDR=Double Data Rate; SDRAM=Synchronous Dynamic Random Access Memory).

BACKGROUND

FB-DIMMs provide larger memory capacities for servers and workstations, higher operational reliability and easier serviceability. Current FB-DIMMs support DDR2-SDRAM memory packages only. Next to a plurality of memory packages, each FB-DIMM includes a special AMB (AMB=Advanced Memory Buffer). The AMB sets up, for example, a serial link to a memory controller not located on the FB-DIMM via an input/output interface including 24 differential line pairs. Typically, control information and data reach the AMB from the memory controller via 10 of the 24 signal line pairs, the AMB in turn deriving therefrom corresponding control information and data for the memory packages on the FB-DIMM and passing same thereto. The interfacing from the memory controller to the AMBs is also referred to as southbound or inbound link. Vice-versa, the link from the FB-DIMM in the direction of the memory controller via 14 line pairs is also referred to as northbound or outbound link.

The FB-DIMM technology manages a maximum of eight modules, that is FB-DIMMs, per memory channel. This means that eight FB-DIMMs may be connected in series to a memory channel of a memory controller. Here, the AMBs form an asynchronous latch chain for the ingoing data in the form of a daisy chain.

Up to 36 memory packages are permitted on an FB-DIMM. As a rule, next to the AMB 18 DDR2-SDRAM memory packages are located on an FB-DIMM loaded on both sides. An additional 18 memory packages may be connected on the module my means of the stacked method. As a result, a memory controller may drive up to 36*8=288 memory packages per memory channel.

AMB-ICs are the central component of FB-DIMMs. By means of a special bus architecture, i.e., the daisy chain architecture mentioned above, a plurality of FB-DIMMs is typically connected in series. Here, there is a point-to-point link between the memory controller and a first FB-DIMM and from the first FB-DIMM to a succeeding FB-DIMM or memory module, etc. This structure makes it possible to access the bus independently of a speed of the SDRAM I/O, whereby both a larger memory capacity and higher speeds are made possible.

In the daisy chain, the AMB Chip captures the ingoing data, that is frames of payload and/or write data, addresses and commands from the preceding FB-DIMM or the memory controller and transmits the same to the subsequent FB-DIMM. Frames destined for their own FB-DIMM, on the basis of their address, are reprocessed by the AMB in order to correspondingly drive the memory packages on this DIMM. Therefore, the AMBs provide distribution of the data among the SDRAM packages.

The FB-DIMM standard provides for data multiplexing with a factor 6. This means that DRAM frames are transmitted from the memory controller to the AMB by means of a 6:1 multiplexer. There, a respective logic demulitplexes the datastream received and passes the extracted information to the individual SDRAM memory chips. For this data exchange, the FB-DIMM technology utilizes a deterministic RAS/CAS protocol. The memory controller and the memory are thus guaranteed to be subject to a controlled repetitive process at each point in time due to self-contained data packets. Simultaneously, the FB-DIMM protocol optimizes memory access to the various FB-DIMMs and therefore significantly increases memory performance.

The FB-DIMM protocol knows two types of data frames. Via the 10-bit wide southbound link, command frames reach the FB-DIMMs, and via the 14-bit wide northbound link, the memory controller receives response frames containing payload data read from the DRAMs.

Current FB-DIMMs with a corresponding AMB are configured for DDR2-SDRAM memory packages. DDR2-SDRAM is a refinement of the DDR-SDRAM concept, wherein a four-fold prefetch is used instead of a double prefetch. In the former DDR standard, valid data was obtained both on the rising and on the falling edge of the clock signal. With DDR2, additional valid data is received in-between these states, which results in four data words per clock. With DDR2-SDRAM, an I/O buffer clocks at a double frequency of the memory packages.

Future FB-DIMMs, so-called FB-DIMM2s, are to be populated with DDR3-SDRAM packages. DDR3-SDRAM is a refinement of the DDR2-SDRAM concept, wherein an eight-fold prefetch is used instead of a four-fold prefetch. In addition, DDR3-SDRAM necessitates a supply voltage of only 1.5 volts, compared to a supply voltage of 1.8 volts for a DDR2-SDRAM and is significantly faster than current DDR and DDR2 memory packages on the basis of the eight-fold prefetch. Therefore, altered AMB2s will have to be employed in future FB-DIMM2 modules compared to the AMBs for DDR2, in order to be able to supply, for example, the higher rotation rates for the DDR3 packages.

Typically, there are several clock frequencies and rotation rates in and around an AMB, which are in a fixed relation to one another. The magnitude of an FBD data rate (FBD=Fully Buffered DIMM) fFBD, for example, is 12 times larger than a core clock frequency fcore. Here, the FBD data rate designates the data rate of the southbound and northbound links, that is the data rate on one of the 10 bit-line or line-pair links of the southbound link, whereon the frames are transferred by 120 bits each. The magnitude of a DDR2 data rate fDDR2 is two times larger than the core clock frequency fcore of the AMB. Here, the DDR2 data rate stands for the payload or write/read data rate with which the DDR2 memory packages may be written to and/or read from, wherein currently DDR2 memory packages with four or eight of such I/O terminals operating with fDDR2 are available. fDDR2 amounts to one-sixth of the FBD data rate fFBD. The core clock frequency fcore is equal to a DDR2 command clock frequency fcmd and is two times larger than an external reference clock frequency fref. The command clock frequency stands for the clock frequency with which commands from the AMB may be transmitted to the memory packages. A relation between the various clock frequencies will remain constant.

The following table exemplarily illustrates a relation of the data rates and frequencies described above.

| fref | fcore | fDDR2 | FFBD |
| --- | --- | --- | --- |
| 133 MHz | 266 MHz | 533 Mbit/s | 3.2 Gbit/s |
| 167 MHz | 333 MHz | 667 Mbit/s | 4.0 Gbit/s |
| 200 MHz | 400 MHz | 800 Mbit/s | 4.8 Gbit/s |

SUMMARY OF THE INVENTION

According to embodiments, the present invention includes a memory buffer for an FB-DIMM with a first input/output interface for communicating with a memory controller having a first data rate, and with a second input/output interface for the communication of read/write data with memory packages having a second data rate, wherein a relation of the second data rate divided by the first data rate is less than 1/10.

According to further embodiments, the present invention includes a FB-DIMM with a memory buffer having a first input/output interface for communicating with a memory controller having a first data rate, and with a second input/output interface for the communication of read/write data with memory packages having a second data rate, wherein a relation of the second data rate divided by the first data rate is less than 1/10.

BRIEF DESCRIPTION OF THE DRAWINGS

Embodiments of the present invention will be detailed subsequently referring to the appended drawings, in which:

FIG. 3 is an example of a conventional ingoing (southbound) packet format;

DETAILED DESCRIPTION OF ILLUSTRATIVE EMBODIMENTS

Figure 1:
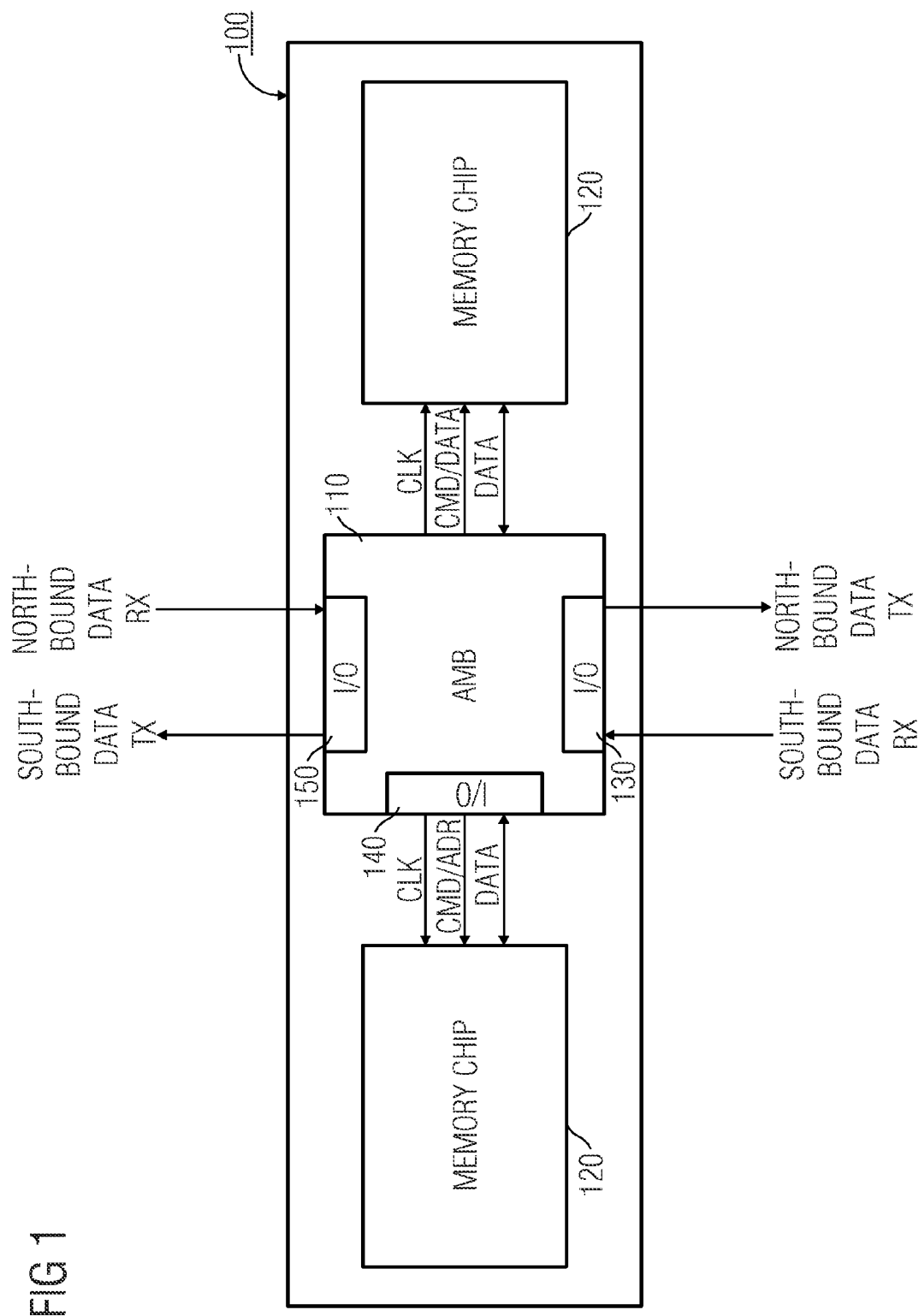
FIG. 1 is a schematic representation of an FB-DIMM.

Referring to the following description, it is to be noted that in the various embodiments in the various figures, like functional elements or functional elements having the same effect have like reference numerals and that the description of these functional elements may be interchangeably applied to all the various embodiments represented in the following so that a repeated description will be omitted.

Before embodiments of the present invention are described in greater detail referring to FIGS. 5 to 7, in the following, a cooperation of various components of a memory system based on the current FB-DIMM technology is to be explained in greater detail with respect to FIGS. 1 to 4. Such a memory system includes a memory controller and one or more FB-DIMMs, wherein the FB-DIMMs each have one AMB and a plurality of memory packages.

FIG. 1 shows a conventional FB-DIMM 100 having one memory buffer and/or one conventional AMB 110 and a plurality of memory packages and/or chips 120, of which an exemplary of two are only shown. The AMB 110 has a first input/output interface 130, a second input/output interface 140, and a third input/output interface 150.

Via the first I/O interface 130, the AMB 110 is able to receive a southbound data packet from a memory controller not shown in FIG. 1 or an adjacent and/or preceding FB-DIMM, or to transmit a northbound data packet to the memory controller or the adjacent FB-DIMM. Via the third I/O interface 150, southbound data packets not addressed to the FB-DIMM 100 may be passed to adjacent FB-DIMMs. Via the third I/O interface 150, the AMB 110 may also receive a northbound data packet from the opposite direction, that is from an adjacent FB-DIMM, and pass the same to the memory controller or a further adjacent FB-DIMM via the first I/O interface 130.

The first I/O interface 130 operates at an FBD data rate fFBD per bit link or per bit line pair. Next to the redundancy information for error correction and/or detection, the ingoing data packets or frames here include, for example, a read/write address, possibly write or payload data or filler bits, and a command such as a read or write command. Received payload data to be stored on the memory packages 120 of the FB-DIMM 100 are transferred from the AMB 110 to the memory packages 120 at the DDR2 data rate fDDR2 via the second I/O interface 140. Furthermore, via the second I/O interface 140, data from the memory packages 120 may be read to the AMB 110, in order to be transmitted therefrom in the direction of the memory controller by means of a northbound data packet at the abovementioned FBD data rate fFBD. With respect to the read/write data, the second I/O interface 140 here operates at a DDR2 data rate fDDR2 per bit link or bit line. The second interface 140 of course in addition also permits commands and addresses to be applied to the memory packages via address and/or command bit lines separate from the data bit lines.

The AMB 110 provides clock signals, control signals and/or address signals for the plurality of the memory packages 120. Furthermore, the AMB 110 may, as has been described above, exchanges read/write data with the plurality of memory packages 120 both in the forward and the reverse direction via the bidirectional interface 140.

Therefore, the AMB 110 forms a central switching center of the FB-DIMM module 100 with the exterior. The AMB 110, for example, decodes from the data stream coming in from the memory controller at the FBD data rate per bit link the commands and/or instructions such as a write command, possibly together with memory address and write data and passes corresponding data, that is a write command, a DRAM memory address and the write data to the memory chips 120 via the second I/O interface 140.

Vice-versa, the AMB 110 may convert parallel DRAM data into data packets at the DDR2 data rate fDDR2 and transmit the same per bit link and/or bit line pair in the direction of the memory controller at the FBD data rate fFBD via 14-bit line pairs.

For a precisely timed coordination of write and read operations between the FB-DIMM and the memory controller, a control logic of the AMB 110 is synchronized with the DRAM chips 120 via a reference clock line or a reference clock frequency fref. In addition, a pass-through logic permits the above-mentioned passing of read and write instructions and/or frames to adjacent FB-DIMMs, that do not explicitly apply to the FB-DIMM 100. The pass-through method allows data flow control for the respective FB-DIMM. Moreover, this technology disposes of a merging logic in read commands, which logically assembles the read data of the individual FB-DIMMs for the memory controller.

Figure 2:
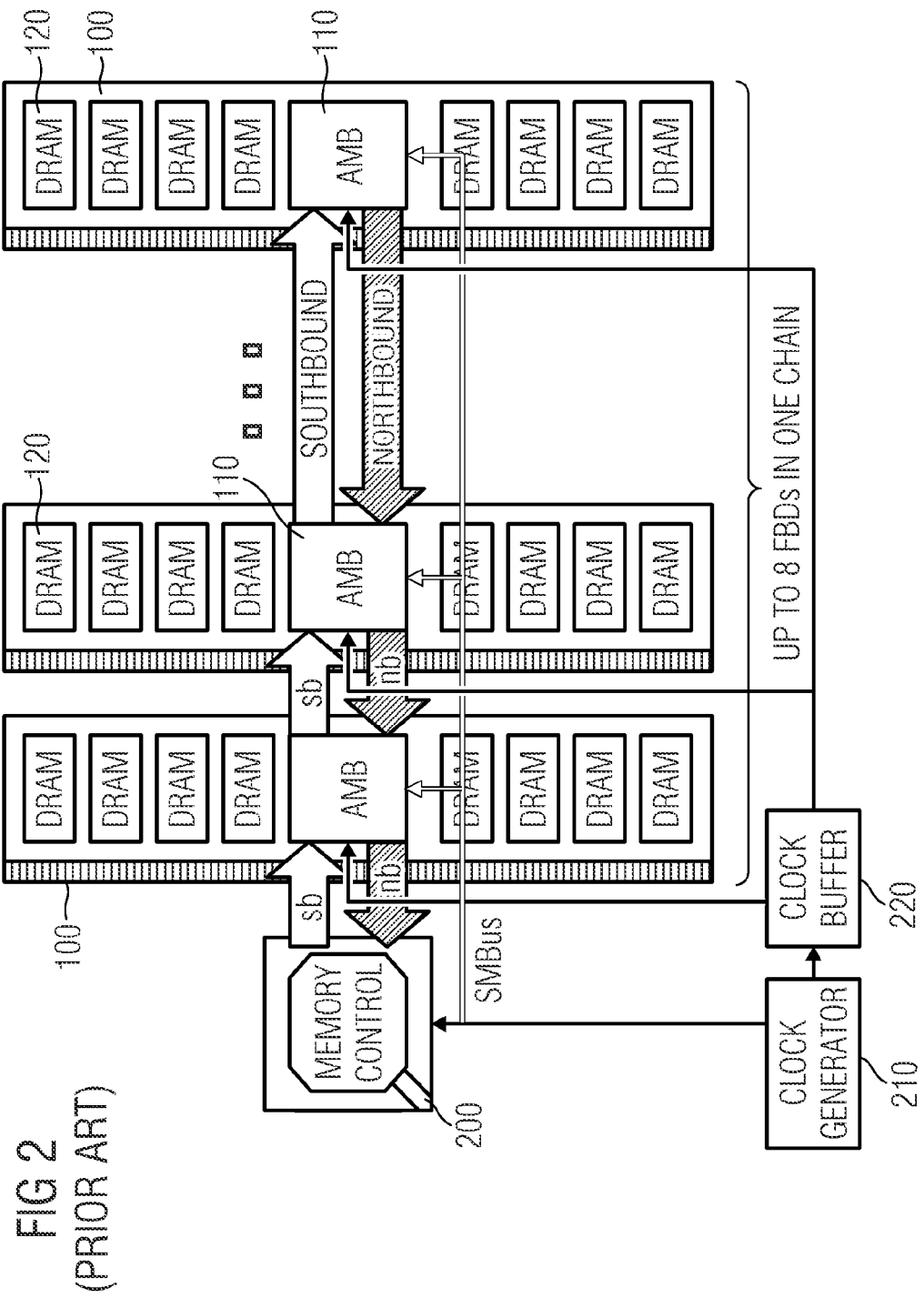
FIG. 2 is a schematic representation of a memory system with multiple conventional FB-DIMMs.

FIG. 2 shows a conventional FB-DIMM memory system comprising a memory controller 200 and a plurality of FB-DIMMs 100. As has been described with respect to FIG. 1, each of the plurality of FB-DIMMs 100 comprises an AMB 110 and a plurality of SDRAM modules 120. Furthermore, FIG. 2 shows a reference clock generator 210 and a reference clock buffer 220.

A conventional FB-DIMM memory system shown in FIG. 2 may comprise up to eight FB-DIMMs in a daisy chain arrangement. Basically, a daisy chain is a number of hardware components connected in series in order to be able to pass data among one another in an asynchronous manner. Here, a first FB-DIMM 100 is directly connected to the memory controller 200. The further FB-DIMMs are each connected to their respective predecessors, and thus an asynchronous latch chain is created (latch=register). A southbound signal to and a northbound signal from an FB-DIMM now passes via its respective predecessor up to the memory controller 200.

The clock frequency generator 210 generates the reference clock frequency fref already described above, which may have values of, for example, fref=133 MHz, fref=167 MHz or fref=200 MHz. The reference clock frequency fref is supplied both to the memory controller 200 for clocking and to the clock buffer 220, in order to spread the reference clock frequency fref to the various FB-DIMMs 100 and/or their AMBs 110. As described above, in an AMB various further clock frequencies or data rates, such as the core clock frequency fcore, are derived from the reference clock frequency by various PLLs (PLL=Phase Locked Loop), for example.

The data transfer from the memory controller 200 to the FB-DIMMs 100 takes place via a serial data bus between the memory controller 200 and the respective AMBs 100. Here, frames with 120 bits each are transmitted by means of 6:1 multiplexers from the memory controller 200 to the respective AMBs 110 by means of possibly a command, an address and write data. There, a respective logic of the AMB 110 demultiplexes the received data stream and/or the received frame by means of 1:6 multiplexers, analyzes the same in order to decide whether its own DIMM 100 is the addressee of the frame and, if so, processes the extracted frame information in order to obtain therefrom command/address data and possibly write data and pass same to the individual memory chips 120. For the frame data exchange, a deterministic RAS/CAS protocol (RAS=Row Address Strobe and CAS=Column Address Strobe) may be used which guarantees, that the memory controller and the DIMMs are subject to a controlled repetitive process at each point in time by means of self-contained data packets. Simultaneously, the FB-DIMM protocol optimizes memory access to the various modules 100 and thus significantly increases memory performance.

A difference can be made between two types of data frames. Via the 10-bit wide southbound link, for example, command frames reach the FB-DIMMs 100, and via the 14-bit wide northbound link, the memory controller 200 receives the response frames. The command frames contain up to three command operations. Same may be distributed among various FB-DIMMs. In addition, a command frame allows a combination of a command operation and of nine bytes, that is 72 bits, of write data. A response frame (northbound) may contain read data from the memory chips 120 or status information. Same is transmitted by the FB-DIMM 100 only if requested by the memory controller 200. Both the response frame and the individual command and data blocks of a command frame are protected from transmission errors by means of redundancy information and/or a CRC checksum (CRC=Cyclic Redundancy Check).

FIG. 3 shows an example of a conventional southbound packet format. As described above, a southbound data packet is transferred in a direction away from the memory controller 200 towards the DIMMs 100. According to the southbound link described above, the southbound packet is 10 bits wide and transmitted to the AMB 110 in twelve FDB link clocks of the data rate fFDB. The first four FDB link clocks may have a cyclic block backup code (CRC) as well as a command (CMD)/address (ADDR) code. A CRC code is a signal which may be used in order to identify and possibly correct an error in the signals transmitted. The remaining FDB link clocks, represented in FIG. 3 by "B", may, for example, contain data to be written or other commands (CMD). The number of data bits to be written in a write command frame presently amounts to an exemplary m=64. In the AMB, these 64 data bits are possibly combined with eight CRC bits, whereby thus a data word with a width of 72 bits is created, which is temporarily latched in the AMB 110 in order to then be transmitted from the AMB 110 by its second I/O interface 140 to the SDRAM packages 120. Moreover, a southbound packet may, for example, have module selection bits for selecting a certain FB-DIMM, command bits, one or more priority selection bits as well as address information.

Northbound data packets, for example, have 128 bits or, including the CRC bits, 144 bits of payload data, which correspond to read-out bits. The northbound link from the AMB 110 to the memory controller 200 has 14 differential line pairs. Accordingly, per FDB link clock cycle, 14-bits are transferred. As in the southbound case, 12 FDB link clock cycles of the fFBD clock rate are necessitated for transferring a complete northbound data packet. In particular, a northbound data packet may comprise, for example, two 72-bit or two 64-bit payload data blocks.

Figure 4:
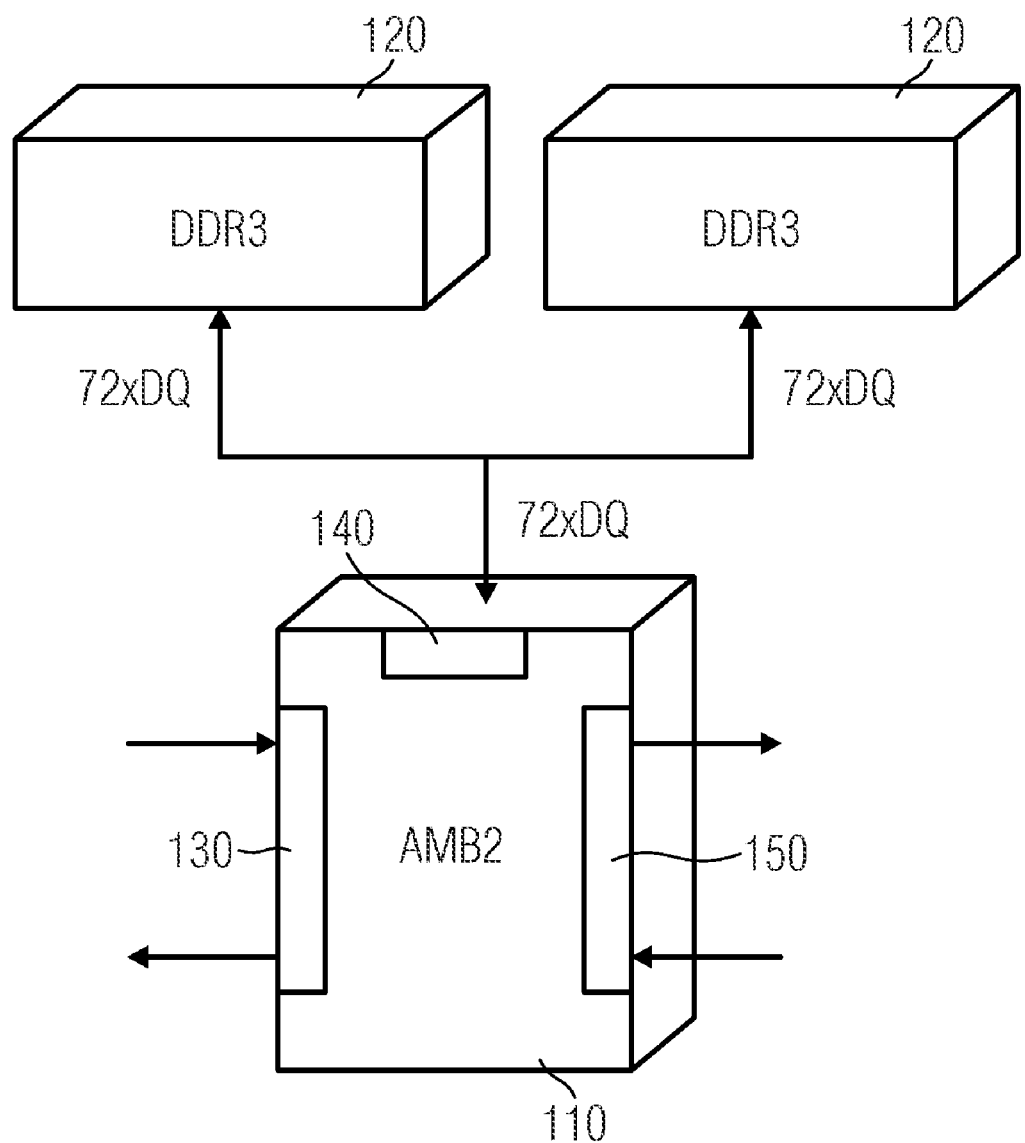
FIG. 4 is a schematic representation of a coupling of a conventional AMB2 memory buffer to DDR3 memory packages.

FIG. 4 shows an AMB chip 110, which is coupled to the DDR memory packages 120 via an I/O interface 140. FIG. 4 shows already the case of an AMB2 with DDR3 packages, wherein FIG. 4 may also readily apply to the case of an AMB with DDR2 as far as the representation is concerned. The sole difference is the double data rate of AMB2 both with respect to fFBD and fDDR# so that in the following, FIG. 4 is first described as if it were an AMB package with DDR2 modules.

The DDR2 memory packages 120 represented in FIG. 4 form various memory ranks of an FB-DIMM. A memory rank is typically defined as a block of m=64 bits or m=72 bits (with CRC), which is generated by the use of some or all SDRAM chips on an FB-DIMM. The smallest unit of 64 or 72 bits each, which may be addressed by southbound frames, may as an entirety only involve one of the two memory ranks. While the read/write-data I/O terminals as well as the address/command inputs of the packages of both ranks are connected to the same terminals of the second interface 140 of the AMB, the AMB is capable of communicating with the memory packages of one rank separately from those of the other rank by transmitting respective chip select signals to the memory packages of the one rank and not to the ones of the other rank. The second I/O interface 140 of an AMB or AMB2 for communicating with memory packages typically includes a command decoder and a FIFO write buffer (FIFO=First In First Out). In the FIFO write buffer, write data are latched before being written to a DDR channel of the second I/O interface 140. The FIFO write buffer typically has 36 entries with 72 bits each. Of these, 32 entries, for example, may be used to store DDR bursts, that is the write data, of a southbound packet.

Vice-versa, an FIFO read buffer is typically used to latch read data supplied by the memory packages 120, in order to subsequently transmit them in the direction of the memory controller 200 via the northbound link by means of a merge and alignment logic.

In the schematic representation shown in FIG. 4, for example, a DDR burst with 72 bits is read from the FIFO write buffer in a first DDR clock cycle and is passed to the memory rank of DDR2 or DDR3 memory packages 120 displayed on the left-hand side. In a second DDR clock cycle, a second DDR burst with m=72 bits (64 bits+8 CRC bits) is passed to the rank of DDR2 or DDR3 memory packages displayed on the right-hand side. Thus, in the conventional FB-DIMM memory system with a conventional AMB or AMB2 shown in FIG. 4, 72 bits per DDR clock are passed from the AMB or AMB2 110 to the memory packages 120.

Figure 5:
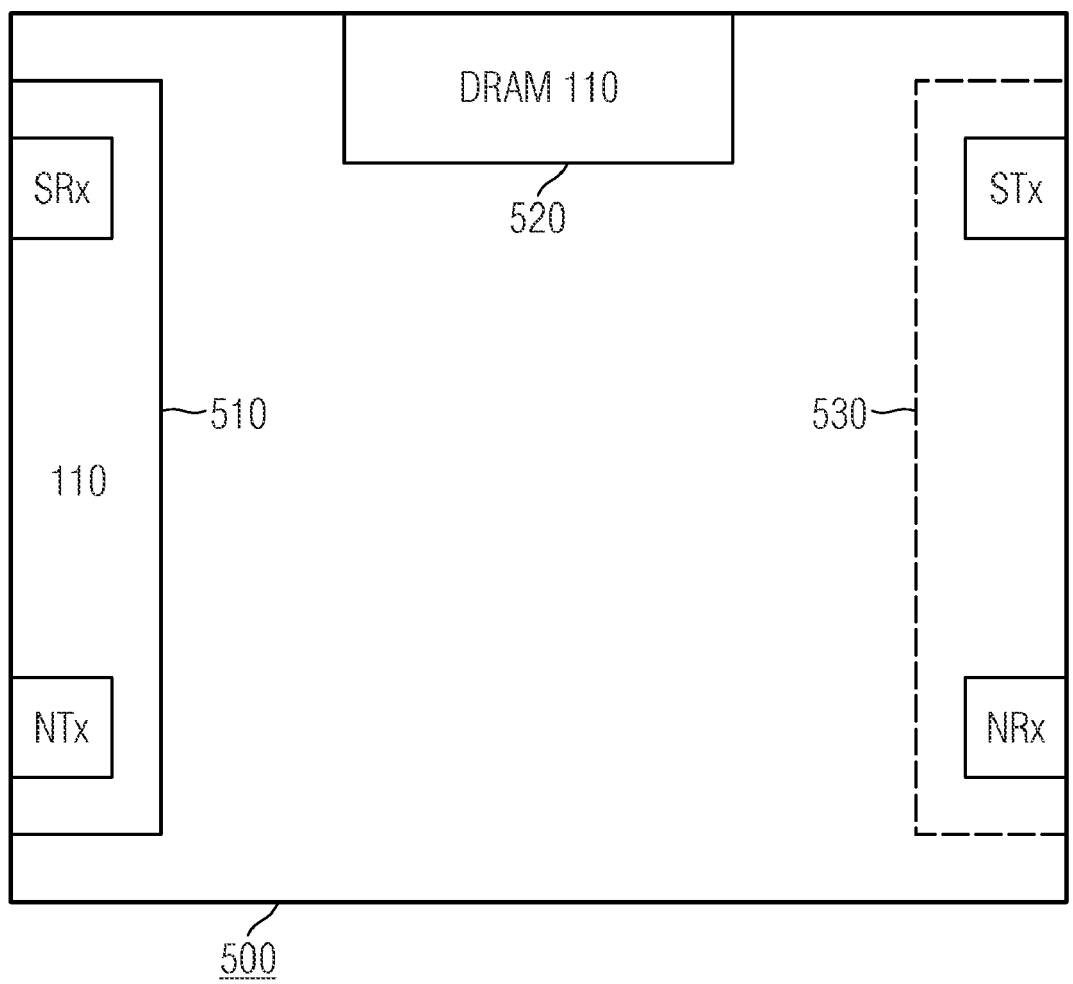
FIG. 5 is a schematic representation of a memory buffer for an FB-DIMM according to an embodiment of the present invention.
Figure 6:
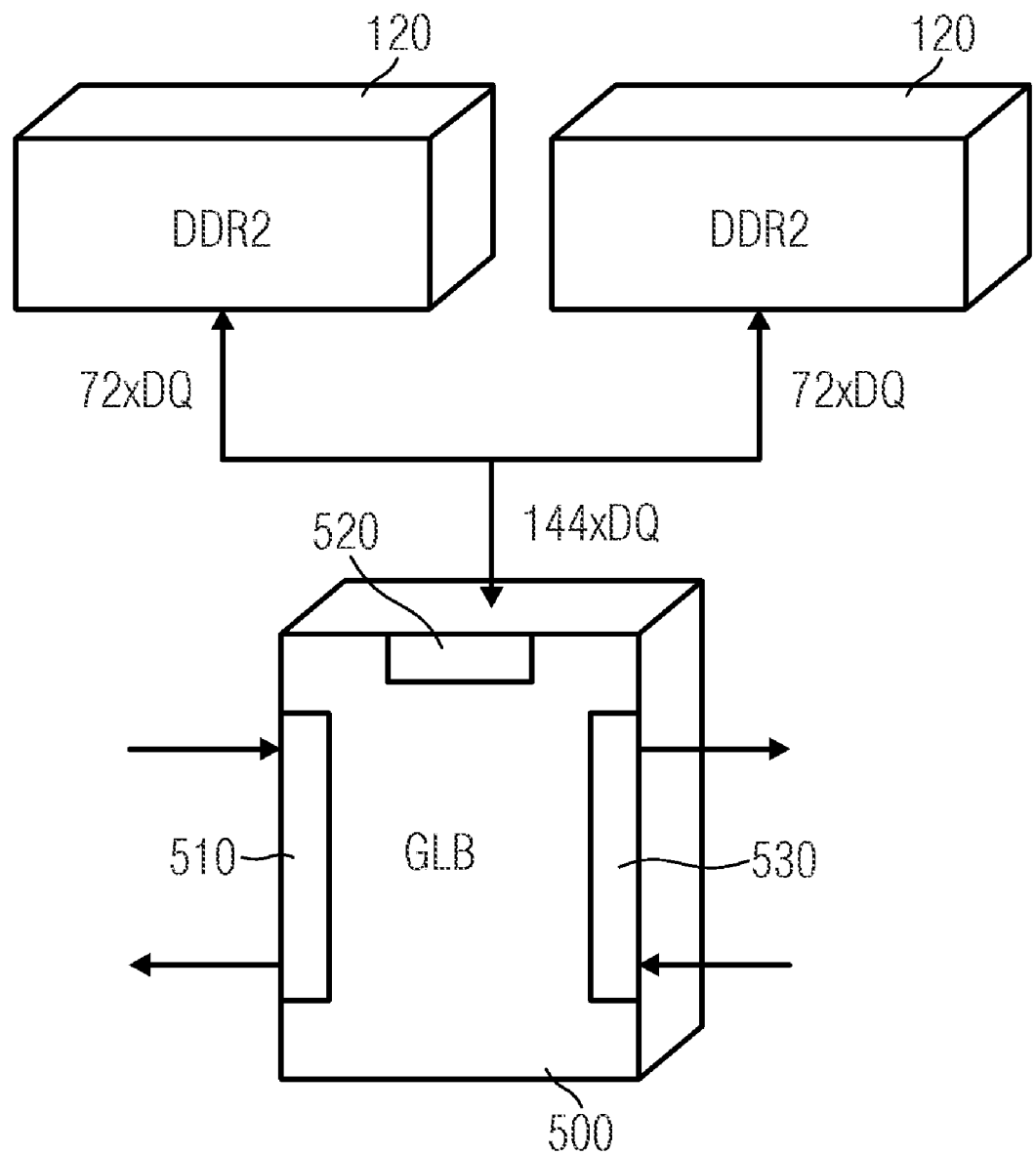
FIG. 6 is a schematic representation of a coupling of an inventive memory buffer for an FB-DIMM to DDR2 memory packages according to an embodiment of the present invention.
Figure 7:
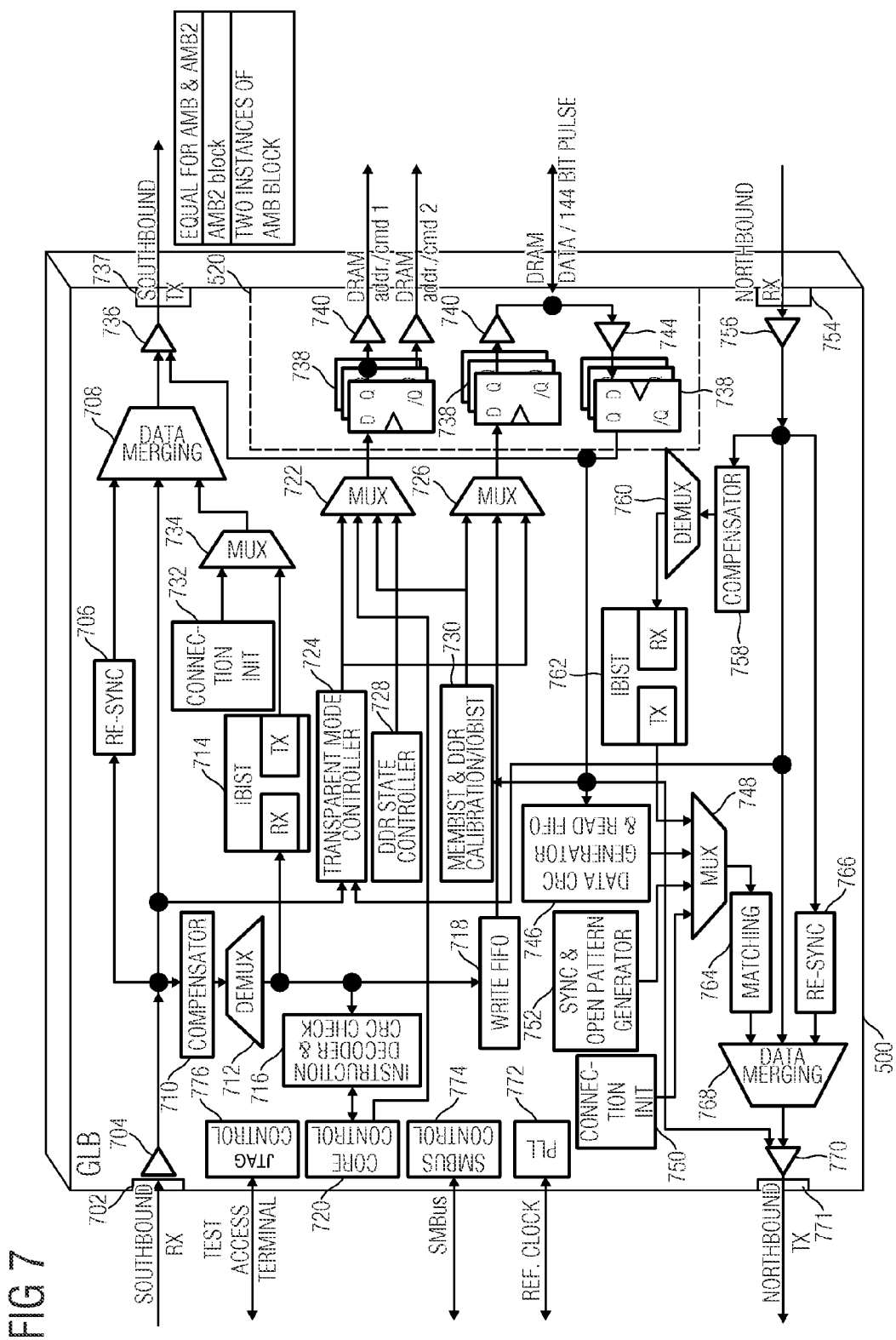
FIG. 7 is a block diagram of a memory buffer for an FB-DIMM according to a further embodiment of the present invention.

Having described conventional FB-DIMM and FB-DIMM2 memory systems and their modes of operation with respect to FIGS. 1 to 4, the following embodiments of the present invention shall be discussed in greater detail with respect to FIGS. 5 to 7.

Manufacturers of processors (CPUs) and/or memory controllers have the choice of either utilizing FB-DIMM or waiting for FB-DIMM2. As a number of cores in the CPUs continually increases, manufacturers are faced with virtually exploding costs for parallel bus interfaces with the memory periphery in order to be able to cover the memory demands of the CPUs.

A memory buffer for FB-DIMMs, according to an embodiment of the present invention, includes a mixture of AMB and AMB2 blocks. In the following, a memory buffer for FB-DIMMs according to an embodiment of the present invention is to be termed GLB (GLB=Generation Leap Buffer).

A GLB operates with DDR2 memory packages. At a constant reference frequency fref, the data rate of DDR2 memory packages amounts to only half the data rate of DDR3 packages, this data-rate difference is compensated for, according to an embodiment of the present invention, by a 144-bit wide second I/O interface for the read/write-data communication with DDR2 memory packages instead of the conventional 72-bit wide second I/O interface for the communication with DDR2 memory packages. In order to be able to service the 144-bit wide second I/O interface for the communication with DDR2 memory packages at the data rate fDDR2 per bit line, the FDB data rate fFBD is doubled as compared to a conventional AMB. The relation of the two data rates fDDR2/fFBD thus amounts to approximately 1/12 in a GLB according to an embodiment of the present invention. Another setting, in which the relation is less than 1/10, is also possible.

An FIFO write buffer of a GLB therefore, according to an embodiment of the present invention, links 64- or 72-bit write data words of two subsequent write packets to form a 128- or 144-bit data word in order to write the thus formed 128- or 144-bit data word, in dependence on, for example, only one address received in the first of the two packets, to the DDR2 memory packages. In other words, the smallest unit addressable in the data packets or frames does in effect not have a size of 64 or 72 bits but of 128 or 144 bits. The memory controller communicating with the GLB, which does know of the emulation of an AMB2 by the GLB and assumes that it performs addressing by 64 or 72 bits by means of the addresses in the southbound frames, is not aware of the emulation and does not have to be changed in its mode of function as long as it outputs read/write frames to the southbound section such as is currently common practice, that the reading/writing of subsequent 64- or 72-bit blocks is requested in pairs, such as, for example, by the serial transmission of two write frames with addresses referring to subsequent 64- or 72-bit blocks. A memory structure according to FIG. 2 is therefore possible as a mixture of FB-DIMM2s with AMB2s and DDR3-SDRAMS and FB-DIMMS with GLBs and DDR2-DRAMs. Therefore, a GLB provides independence from the introduction of FB-DIMM2.

In the previous example showing the two subsequent write frames, the GLB, for example, uses the address from the first frame only and therefrom derives a DRAM address for the common driving of all DDR2-DRAMs, the 4 or 8 I/O pins of which are connected to 4 or 8, respectively, of the 144 pins of the GLB in order to make writing and reading by 144 bits possible. The DRAM address is, for example, used for the simultaneous driving of all DDR2-DRAMS at the 128-144-bit interface of the GLB, or else, for example, the DRAMs to one side of the GLB on the FB-DIMM are driven with the DRAM address in inverted form.

Each second effective address in the southbound frames, such as that of the second write frame mentioned above, is, for example, discarded or checked for correctness or for the fact that it points to the 64-72-bit sequence block. In other words, the GLB maps the addresses of the southbound frames to the DRAM addresses such that the total memory space of the DRAMs connected to the 128-144-bit interface is addressable in smallest units of 128 or 144 bits only, whereas the same is possible with AMB and AMB2 on a 64-bit basis, given the same memory space with, for example, two ranks. The GLB is however capable of evaluating addresses that are in fact too long by 1 bit and would therefore be capable of addressing the total memory space on a 64-bit basis, by the GLB, for example, ignoring the LSB or the least significant bit of the addresses in the southbound frames. The above discussed of course also applies to the read addresses of the read-command frames. These, too, are processed by the GLB in pairs only.

FIG. 5 shows a memory buffer or GLB 500 for an FB-DIMM according to an embodiment of the present invention. The GLB 500 comprises a first input/output interface 510 and a second input/output interface 520. In the schematic representation of the memory buffer 500 in FIG. 5, a third input/output interface 530 is shown for the sake of completeness.

The GLB 500 may receive from a memory controller not shown in FIG. 5 or an adjacent or preceding FB-DIMM, a southbound data packet via the first I/O interface 510 at a data rate of fFBD per bit line pair, or transmit a northbound data packet to the memory controller or the adjacent FB-DIMM. Southbound data packets not addressed to the GLB 500 may be passed to GLBs on adjacent FB-DIMMS via the third I/O interface 530. The GLB 500 may also receive a northbound data packet from the opposite direction, that is from an adjacent FB-DIMM, via the third I/O interface 530 and pass same to the memory controller or a further adjacent FB-DIMM via the first I/O interface 510.

The first I/O interface 510 operates at an FBD data rate fFBD per bit link or per bit-line pair. Payload data received, that is read/write data to be stored on memory packages coupled to the second I/O interface 520, are transferred from the GLB 500 to the memory packages at the DDR2 data rate fDDR2 per bit line via the second I/O interface 520 which has, according to an embodiment of the present invention, a width of 144 bits (128 data bits+16 CRC bits). Furthermore, data from the memory packages may be read into the GLB 500 via the second I/O interface 520, in order to be transmitted therefrom in the direction of the memory controller by means of a northbound data packet at the previously discussed FBD data rate fFBD. With respect to the read/write data, the second I/O interface 520 here operates at a DDR2 data rate fDDR2 per bit link or bit-line. Based on the double bus width of the second I/O interface 520 as compared to conventional AMBs or AMB2s, the payload data rate relation fDDR2/fFBD=1/12 according to an embodiment of the present invention. In addition, the second interface 520 of course also permits applying commands and addresses to the memory packages via address and/or command bit-lines separated from the data-bit lines. The basic modes of operation of the I/O interfaces 510 and 530 have been explained above with respect to FIGS. 1 to 3.

A schematic representation of the second I/O interface 520 (DDR2 interface) according to an embodiment of the present invention is shown in FIG. 6.

FIG. 6 shows a memory buffer or GLB 500 according to an embodiment of the present invention having the first input/output interface 510 for communicating with, for example, a memory controller or adjacent memory buffers, the second interface 520 for communicating with DDR2 modules located on an FB-DIMM according to an embodiment of the present invention, and the third input/output interface 530 for communicating with adjacent memory buffers.

As can be seen in FIG. 6, the DDR2 interface of the memory buffer or GLB according to an embodiment of the present invention has a width of 144 bits. On the other hand, there is the DDR interface having a width of 72 bits of a conventional AMB or AMB2, as has been described with respect to FIG. 4.

Typically, DDR2 memory packages have n=4 (x4-DDR2) or n=8 (x8-DDR2) data I/O pins. If a GLB with a DDR2 interface having a width of l=144 bits is used, a corresponding memory rank will be a block of l=144 bits (128 data bits with 16 CRC bits), which is generated by the use of N SDRAM chips on an FB-DIMM according to an embodiment of the present invention. Accordingly, an FB-DIMM according to embodiments of the present invention is populated with N=1/n, that is either 144/4=36 x4-DDR2- or 144/8=18 x8-DDR2 memory packages, in order to be able to write and read the l=144 bits.

An FIFO write buffer of the GLB 500 not shown in FIG. 6 is filled with the double number of data bits per time unit, in order to be able to service the double-width (144 bits) bus of the second interface 520 for communicating with DDR2 packages located on an FB-DIMM according to an embodiment of the present invention. In order to ensure this, the FDB data rate fFBD of the first input/output interface 510 and/or the third I/O interface 530 also doubles as compared to conventional memory buffers such as AMB or AMB2. Therefore, the relation of the DDR data rate fDDR2 to the FBD data rate fFBD in a memory buffer or GLB for an FB-DIMM according to an embodiment of the present invention, amounts to at least approximately the value of fDDR2/fFBD=1/12, whereas in a conventional AMB or AMB2 on a conventional FB-DIMM or a conventional FB-DIMM2, respectively, this relation amounts to fDDR2/fFBD=1/6.

The tables listed below show the relationships of the various frequencies towards each other in a conventional AMB/FB-DIMM system,

| $f_{ref}$ | $f_{core}$ | $f_{DDR2}$ | $F_{FBD}$ |
|---|---|---|---|
| 133 MHz | 266 MHz | 533 Mbit/s | 3.2 Gbit/s |
| 167 MHz | 333 MHz | 667 Mbit/s | 4.0 Gbit/s |
| 200 MHz | 400 MHz | 800 Mbit/s | 4.8 Gbit/s | in a conventional AMB2/FB-DIMM2 system and

| $f_{ref}$ | $f_{core}$ | $f_{DDR2}$ | $F_{FBD}$ |
|---|---|---|---|
| 133 MHz | 266 MHz | 1066 Mbit/s | 6.4 Gbit/s |
| 167 MHz | 333 MHz | 1333 Mbit/s | 8.0 Gbit/s |
| 200 MHz | 400 MHz | 1600 Mbit/s | 9.6 Gbit/s | in a system according to an embodiment of the present invention.

| $f_{ref}$ | $f_{core}$ | $f_{DDR2}$ | $F_{FBD}$ |
|---|---|---|---|
| 133 MHz | 266 MHz | 533 Mbit/s | 6.4 Gbit/s |
| 167 MHz | 333 MHz | 667 Mbit/s | 8.0 Gbit/s |
| 200 MHz | 400 MHz | 800 Mbit/s | 9.6 Gbit/s |

It can therefore be seen that using an FB-DIMM, according to an embodiment of the present invention, having a GLB and DDR2 memory packages in the direction each from and to the memory controller, serves to achieve at least approximately the same data rates as the use of a conventional AMB2/FB-DIMM2 system with DDR3 memory packages.

An inventive memory buffer or GLB may therefore achieve two objects. Firstly, it can act as a test chip, which enables testing the serial-memory-buffer technology of the next memory generation (DDR3) prior to the relevant DDR3 SDRAMs being available. Secondly, it offers an opportunity to retreat to DDR2 technology in the case of a system which as such operates with speeds which may be achieved by the employing a DDR3 technology only.

By employing a GLB, according to an embodiment of the present invention, on an FB-DIMM with DDR2 memory packages, at least approximately the same performance may be achieved as with the use of an FB-DIMM2 with DDR3 memory packages. Here, the following table shows, which DDR3 memory packages may be replaced by DDR2 packages if a GLB according to an embodiment of the present invention is used.

| DDR2 Replacement | DDR3 for FB-DIMM2 |
|---|---|
| DDR2-533 | DDR3-1066 |
| DDR2-667 | DDR3-1333 |
| DDR2-800 | DDR3-1600 |

The DDR2 data rate fDDR2 per bit-line may be determined to be fDDR2=4 bit·fref, assuming the 4-fold prefetch and the reference frequency fref. A DDR3 data rate fDDR3 per bit line may be determined to be fDDR3=8 bit·fref, assuming an 8-fold prefetch and the reference frequency fref.

As has been explained above, by means of a double-width DDR2 interface according to an embodiment of the present invention, the use of the GLB serves to achieve at least approximately the same performance as the use of a future AMB2, which, for example, accesses two memory ranks of DDR3 memory packages. Based on the double amount of DQ pins of the DDR2 interface necessitated, as compared to a conventional AMB2, a GLB necessitates a special design of an FB-DIMM PCB (PCB=Printed Circuit Board).

A memory controller reads and writes memory data as a pair of entries in order to communicate with a GLB. For southbound data packets from a memory controller to the GLB, this, for example, means that a data packet with a 64-bit data field will be followed by a second data packet with a 64-data field also. The data rate fFBD per bit line on the serial FBD link will be, at least approximately, 12 times the DDR2 data rate fDDR2 and 24 times the GLB core frequency fcore and 48 times the reference frequency fref. Therefore, by means of a memory system according to an embodiment of the present invention, a performance of DDR3 memory packages may be achieved with DDR2 memory packages, as far as speed is concerned. For example, by employing a GLB, the performance of DDR3-1333 DRAMs may be achieved with DDR2-667-DRAMs. Therefore, a GLB may be employed together with DDR2-FB-DIMMs, according to an embodiment of the present invention, in the same systems in which a conventional AMB2 is used together with DDR3-FB-DIMMs.

FIG. 7 shows a detailed block diagram of a GLB 500 according to an embodiment of the present invention.

At a first input 702 as part of the first I/O interface 510, the GLB 500 has an amplifier 704, the output of which is connected to a re-sync block 706, a data merge block 708 and a deskew block 710. An output of the deskew block 710 is coupled to an input of a demultiplexer 712, the output of which is coupled to an input of an IBIST block 714 (IBIST=Interconnect Built-In Self Test), an input of a command-decoder and CRC-check block 716 and an input of a write FIFO 718. The command-decoder and CRC-check block 716 is further connected to a core control block 720, the core control block 720 further coupled to an input of a multiplexer 722. The output of the amplifier 704 is also connected to an input of a transparent mode control block 724, the output of which is coupled to the multiplexer 722 and a further multiplexer 726. An output of the write FIFO 718 is also coupled to an input of the multiplexer 726. Furthermore, the GLB 500 comprises a DDR state control block 728, the output of which is connected to an input of the multiplexer 722. An output of an MEMBIST block 730 (MEMBIST=Memory Built-In Self Test) is connected to an input of the multiplexers 722 and 726 each. An output of the IBIST block 714 as well as an output of a link init block 732 are coupled to inputs of a further multiplexer 734, the output of which is coupled to an input of the data merge block 708. An output of the data merge block 708 is connected to an output amplifier 736, the output of which forms a southbound transmit output 737 as part of the third I/O interface 530 of the GLB 500. An output of the multiplexer 722 forms an input of a D flip-flop chain 738, the outputs and inverting outputs of which are coupled to amplifiers 740. An output of the multiplexer 726 is connected to data inputs of a further D flip-flop chain 738 wherein non-inverting outputs of the D flip-flop chain 738 are amplified by transmitting amplifiers 740 and form a 144-bit wide I/O interface 520 for communicating with memory packages not shown in FIG. 7. For receiving data from DRAMs not shown in FIG. 7, the 144-bit wide I/O interface 520 is coupled to an input amplifier 744, the output of which is connected to a further D flip-flop chain 738. The outputs of the D flip-flop chain 738 are connected both to the transmitting amplifier 736 and to an input of the MEMBIST block 730, an input of a CRC-generator and read FIFO block 746 and the input of a multiplexer 748. An output of the CRC-generator and read FIFO block 746 is connected to an input of the multiplexer 748. Furthermore, an output of a link init block 750 and an output of a sync-and-idle-pattern generator block 752 form further inputs of the multiplexer 748. A northbound receive input 754 as part of the third I/O interface 530 of the GLB 500 is amplified by a receiving amplifier 756. The output of the amplifier 756 is connected to an input of a deskew block 758, the output of which is connected to a demultiplexer 760, the output of the demultiplexer 760 being coupled to an input of a second IBIST block 762. An output of the IBIST block 762 forms a further input of the multiplexer 748, the output of which is coupled to an alignment block 764. The output of the receiving amplifier 756 is further connected to an input of a re-sync block 766, the output of which is coupled to an input of a data merge block 768. Furthermore, the output of the amplifier 756 is connected to an input of the data merge block 768, as is an output of the alignment block 764. An output of the data merge block 768 is connected to a transmitting amplifier 770, the output of which forms a northbound output 771 as part of the first I/O interface 510 of the GLB 500. Furthermore, the GLB 500 comprises a PLL block 772, a system-management bus-control block 774 and a JTAG control block 776.

The southbound input 702 of the first input/output interface 510 for communicating with a memory controller has ten differential inputs. Based on the PCB layouts, data on the ten differential lines may have different transit times and/or phase shifts. The deskew block 710 serves to compensate for these transit-time and/or phase differences. The demultiplexer 712, which is a 1:6 demultiplexer, serves to demultiplex a received data stream at a first payload data rate fFBD per bit line, and received command and/or CRC bits are subsequently passed to the command-decoder and CRC-check block 716. Data bits of a received southbound packet are passed to the write FIFO 718 at a second payload data rate fDDR2. The FBD payload data rate fFBD amounts to at least approximately 12 times the DDR2 payload data rate fDDR2.

In order to address, for example, memory packages not shown in FIG. 7, the output of the multiplexer 722 is connected to the data inputs of the D flip-flop chain 738, the outputs and/or address outputs and inverting outputs or address outputs of which are coupled to the amplifiers 740, the address outputs being part of the second input/output interface 520. The address outputs may be connected to respective address inputs of the memory packages not shown in FIG. 7, and the second input/output interface 520 may be asserted in order to output thereat like memory package addresses or memory package addresses with a predetermined relation to one another.

Several clock rates described above and necessitated in the GLB 500 are generated by means of the PLL block 772 based on a reference frequency fref fed to the PLL block 772. This reference frequency fref may have values of fref=133 MHz, fref=167 MHz or fref=200 MHz. The PLL block 772 may generate from the reference frequency fref a GLB core frequency fcore, which is, for example, equal to the double reference frequency.

For the communication with the memory packages, the payload data received via the southbound packets, which was latched in the write FIFO 718, may be passed to the DRAMs on the FB-DIMM via the multiplexer 726 and the 144-bit wide second I/O interface 520 at a second payload data rate fDDR2. Like a conventional AMB or AMB2, the GLB 500 too may pass data intended for another GLB in a daisy chain of several GLBs via the southbound data output by means of the pass-through logic. In order to compensate for random or periodic phase shifts on the individual lines, the passed data may previously be recollected and/or re-synchronized by means of the re-sync block 706 of the pass-through logic.

Data read from the DRAMs are written to the read FIFO 746 via the 144-bit wide second I/O interface 520 at the DDR2 data rate fDDR2. By means of the multiplexer 748 and the alignment block 764, the data is inserted into a northbound data stream via the data merge block 768. Here, the FBD payload data rate fFBD amounts to at least approximately 12 times the DDR2 payload data rate fDDR2 in the northbound direction as well.

For reasons of clarity, a further description of the remaining blocks of the GLB 500 is omitted here. The remaining blocks generally serve to meet FB-DIMM standard.

Based on the 1/12 relation of the DDR2 data rate fDDR2 and the FBD data rate fFBD, an inventive memory buffer or GLB for FB-DIMMs with DDR2 memory packages may serve to achieve at least approximately the same performance as a conventional AMB2/FB-DIMM2 system with DDR3 memory packages. One advantage of embodiments of the present invention is therefore the fact that an availability of FB-DIMMs may be extended to two DRAM technology lifecycles. Therefore, either DDR2 or DDR3 DRAMs may be used for the same server system, depending on, for example, the availability and/or the price of the DRAMs, wherein DDR2 packages are employed together with a GLB, according to an embodiment of the present invention, on an FB-DIMM, according to an embodiment of the present invention, and DDR3 modules together with a conventional AMB2 on an FB-DIMM2.

FB-DIMMs with GLBs, according to an embodiment of the present invention may, as is indicated in FIG. 2, be connected together to form an FB-DIMM memory system comprising a memory controller 200 as well as a plurality of FB-DIMMs. Here, the FB-DIMMs of the daisy chain may comprise both AMB2/DDR3 packages and GLB/DDR2 packages, as the northbound/southbound data rates fFBD are identical in both configurations.

Therefore, a further advantage of the memory buffer or GLB, according to embodiments of the present invention, is the fact, that it may, for example, be used as a test chip in order to test an AMB2 environment and in particular the FBD data rates attainable with AMB2, and that prior to the introduction of the AMB2 technology.

In summary, it must be mentioned again that a GLB or memory buffer according to an embodiment of the present invention necessitates double the amount of DQ pins at the second input/output interface for communicating with memory packages, as compared to a conventional AMB or AMB2 chip. Therefore, a special FB-DIMM PCB is also necessitated if a memory buffer or GLB, according to an embodiment of the present invention, is to be employed.

With respect to the above embodiments, it is to be understood that same may of course readily be applied to other technologies. The differential technique in the southbound and northbound data transfer is, for example, exemplarily only. Simple bit lines may also be used. Furthermore, a transfer to memory packages other than DDR# chips is also possible. The size of the read/write-data bit width of 128 or 144 bits was also only an example and may be chosen differently with other configurations of the southbound/northbound buses in order to achieve the data rate relation of less than 1/10 outlined above.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A memory buffer for an FB-DIMM comprising:
   a first input/output interface for communicating with a memory controller at a first data rate; and
   a second input/output interface for the communication of read/write data with memory packages at a second data rate,
   wherein a relation of the second data rate divided by the first data rate is less than 1/10.

2. The memory buffer of claim 1, wherein the memory packages are DDR2-SDRAMS.

3. The memory buffer of claim 1, wherein the FB-DIMM comprises N memory packages and each memory package comprises an n-bit data input/output interface for read/write data at the second data rate so that the second input/output interface comprises a data input/output comprising a width of 1=N·n bits at the second data rate per bit.

4. The memory buffer of claim 3, wherein the first input/output interface forms a data packet protocol interface for ingoing data packets which comprise a write command, a memory address and an in-bit data word or a read command and a memory address.

5. The memory buffer of claim 4, wherein $1 \geq 2 \cdot m$.

6. The memory buffer of claim 5, wherein m=64.

7. The memory buffer of claim 6, wherein l=144.

8. The memory buffer of claim 1, wherein the memory buffer further comprises means for linking m-bit data words of two subsequent packets to form a 2m-bit data word and writing the 2m-bit data word to the memory packages in dependence on an address received in the first of the two packets.

9. The memory buffer of claim 1, wherein the second input/output interface further comprises one or more address outputs, that are connected to respective address inputs of the memory packages, and wherein the one or more address outputs are enabled to output like memory package addresses or memory package addresses with a predetermined relation to one another.

10. An FB-DIMM comprising:
    a plurality of memory packages coupled to a substrate; and
    a memory buffer coupled to the substrate, the memory buffer having a first input/output interface for communicating with a memory controller at a first data rate and a second input/output interface for communicating read/write data with the memory packages at a second data rate, wherein the relation of the second data rate divided by the first data rate is less than 1/10.

11. The FB-DIMM of claim 10, wherein the memory packages comprise DDR2-SDRAMS.

12. The FB-DIMM of claim 10, wherein the memory packages comprise the N memory packages, each memory package comprising an n-bit data input/output interface for read/write data at the second data rate such that the second input/output interface comprises a data input/output comprising a width of 1=N·n bits at the second data rate per bit.

13. The FB-DIMM of claim 12, wherein the first input/output interface of the memory buffer forms a data packet protocol interface for incoming data packets.

14. The FB-DIMM of claim 13, wherein the incoming data packets each comprise a write command, a memory address and an in-bit data word or a read command and a memory address.

15. The FB-DIMM of claim 13, wherein $1 \geq 2 \cdot m$.

16. The FB-DIMM of claim 14, wherein m=64.

17. The FB-DIMM of claim 15, wherein l=144.

18. The FB-DIMM of claim 10, wherein the memory buffer further comprises means for linking m-bit data words of two subsequent packets to form a 2m-bit data word and writing the 2m-bit data word to the memory packages in dependence on an address received in the first of the two packets.

19. The FB-DIMM of claim 10, wherein the second input/output interface of the memory buffer further comprises one or more address outputs, that are coupled to respective address inputs of the memory packages, and wherein the one or more address outputs are enabled to output thereat like memory package addresses or memory package addresses with a predetermined relation to one another.

20. A method for operating a memory buffer for an FB-DIMM, the method comprising:
    communicating with a memory controller at a first data rate; and
    communicating read/write data with memory packages at a second data rate,
    wherein a relation of the second data rate divided by the first data rate is less than 1/10.

* * * * *